United States Patent [19]

Mongeau

[11] Patent Number: 5,223,775
[45] Date of Patent: Jun. 29, 1993

[54] APPARATUS AND RELATED METHOD TO COMPENSATE FOR TORQUE RIPPLE IN A PERMANENT MAGNET ELECTRIC MOTOR

[75] Inventor: Peter P. Mongeau, Hopkinton, Mass.
[73] Assignee: EML Research, Inc., Hudson, Mass.
[21] Appl. No.: 783,298
[22] Filed: Oct. 28, 1991
[51] Int. Cl.⁵ .............................................. H02P 7/00
[52] U.S. Cl. .................................. 318/432; 318/254; 388/902
[58] Field of Search ............... 318/432, 632, 254, 138, 318/439, 696, 685, 798-812, 603, 633, 634; 388/810, 815, 823, 902, 904

[56] References Cited

U.S. PATENT DOCUMENTS

| | | | |
|---|---|---|---|
| 4,415,844 | 11/1983 | Mendenhall et al. | 318/254 |
| 4,443,906 | 4/1984 | Tucker et al. | 318/799 X |
| 4,484,126 | 11/1984 | Fulton et al. | 318/800 |
| 4,868,477 | 9/1989 | Anderson et al. | 318/696 |
| 4,879,502 | 11/1989 | Endo et al. | 318/808 X |
| 4,962,339 | 10/1990 | Schauder | 318/806 X |
| 4,992,715 | 2/1991 | Nakamura et al. | 318/432 X |
| 5,021,941 | 6/1991 | Ford et al. | 318/632 X |
| 5,057,758 | 10/1991 | Oliver et al. | 318/603 |

Primary Examiner—Jonathan Wysocki
Attorney, Agent, or Firm—McCormick, Paulding & Huber

[57] ABSTRACT

An input control current command signal is modified in accordance with a number of compensation factors stored in a memory and corresponding to each of a number of angular shaft positions to provide a control signal to cause an inverter to drive each of the number of phases of a permanent magnet axial-field motor to cause the motor to produce a ripple-free torque output. The compensation values stored in the memory are identified and determined in accordance with the source of the torque ripple such as vibration, load operation, noise and variations within the motor construction.

5 Claims, 5 Drawing Sheets

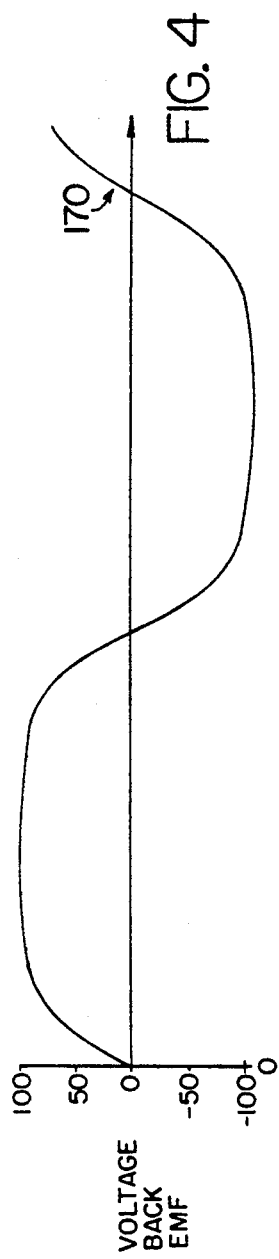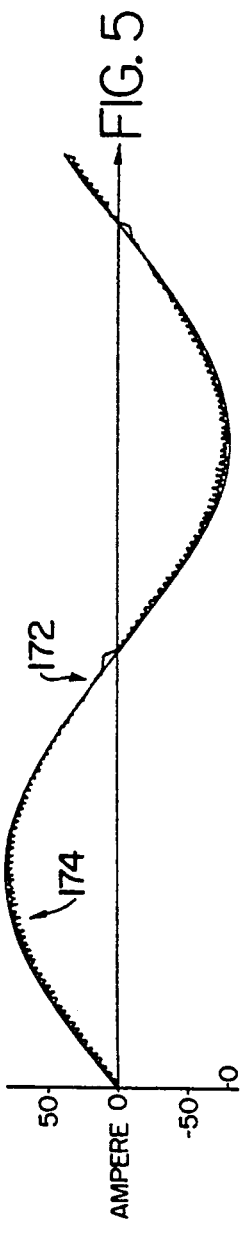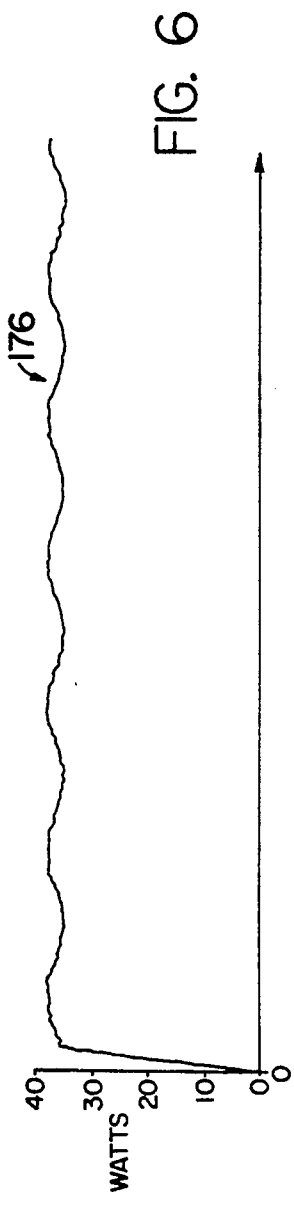

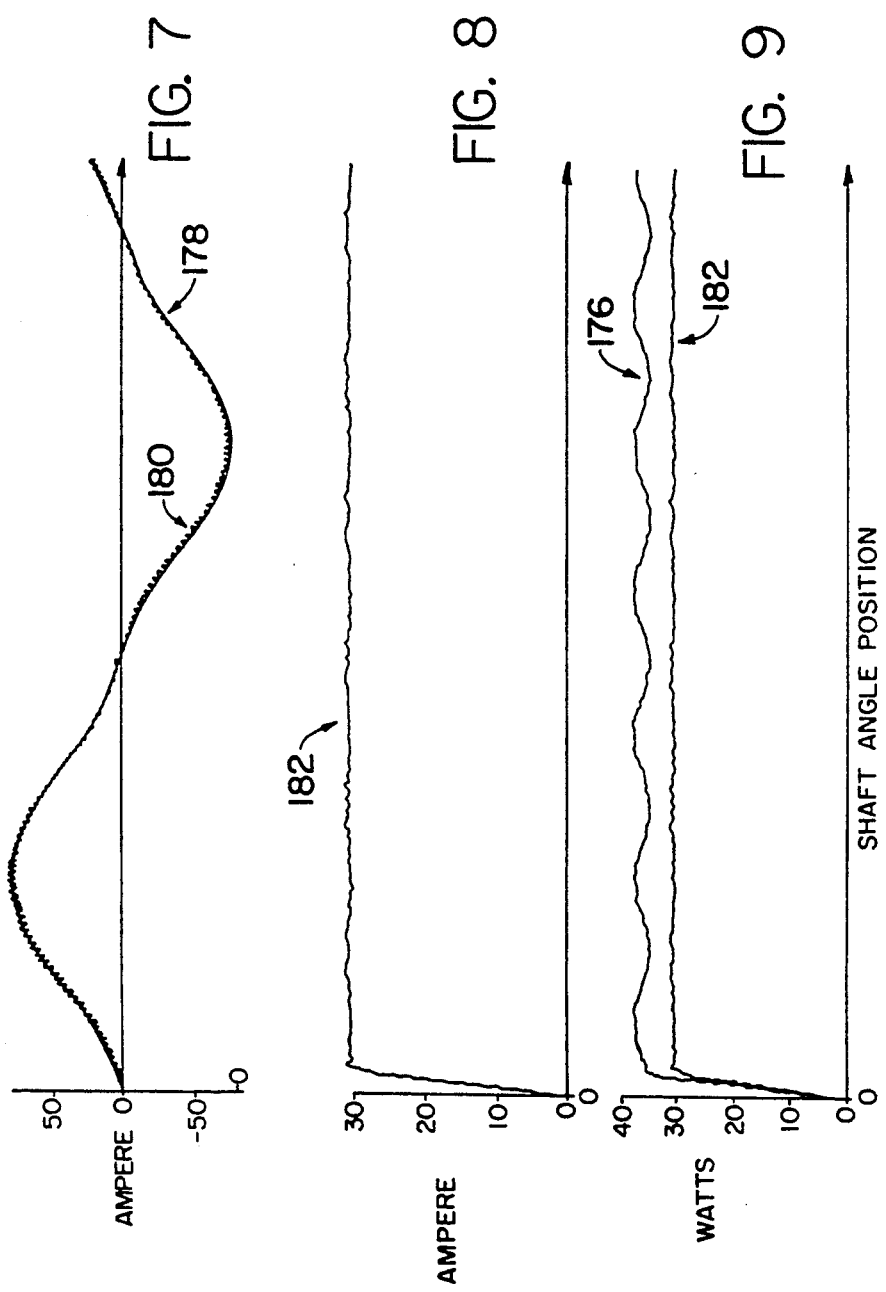

APPARATUS AND RELATED METHOD TO COMPENSATE FOR TORQUE RIPPLE IN A PERMANENT MAGNET ELECTRIC MOTOR

BACKGROUND OF THE INVENTION

The present invention relates generally to motor control and deals more specifically with apparatus and a related method to compensate for torque ripple in a permanent magnet electric motor.

The use of a permanent magnet motor is generally well known with typical motor system applications including a combination of a permanent magnet alternator and an inverter drive whose output driving signal is synchronized to the rotor position. Such a motor is known in the art as a brushless DC drive motor and its configuration is somewhat similar to a conventional commutator type DC motor having a separately excited field winding. It is also known to excite the motor with an inverter drive output signal having a simple rectangular pulse waveform to cause the motor to operate at a speed which is substantially proportional to the magnitude of the DC voltage from which the inverter operates. The torque produced will be generally proportional to the DC current. It is further known to excite the motor with a pulse width modulated (PWM) inverter drive voltage to replicate the performance of a variable DC voltage driven motor.

The class of conventional brushless DC motors have advantages and disadvantages compared to the conventional commutator type DC electric motor, particularly when comparing the torque ripple and noise is that is generated. The conventional brushless DC motor produces large torque ripple which is due primarily to the relatively small number of phases driving the electric motor compared to the relatively large number of commutator bars on a conventional commutator type DC electric motor. The noise produced by a conventional brushless DC electric motor tends to be high as a result of the high torque ripple and also due to the relatively quick transitions of the phase commutation and pulse width modulation (PWM) steps in the driving voltage waveform.

It is desirable to reduce the torque ripple and noise generated by an electric motor particularly in applications wherein generated noise is of a great concern. Such an application might be for example, the propulsion of an undersea vehicle. Of particular importance as a source of noise is torque ripple which has a direct and difficult to interrupt path for transmission to the water through which the undersea vehicle passes.

One known approach to reduce torque ripple and noise in a brushless DC motor is to create a field flux and an armature current both of which are distributed approximately as a sinusoidal function of an angle and to then operate the inverter drive and filter the output of the drive in such a way to create an applied drive voltage which is substantially a sinusoidal function of time. The performance of a brushless DC motor approximates that of a AC electric motor with this approach. Although the torque ripple and noise are reduced, the approach is generally unsatisfactory due to the increase in size of the electric motor and the reduction in the power output achieved. In addition, the above method to reduce torque ripple and noise is somewhat limited due to the difficulty, complexity and often inability to approximate the desired waveforms.

It is a general aim therefore of the present invention to provide a permanent magnet electric motor and a solid state power inverter combination to precisely control output torque and to minimize noise generation.

It is a further aim of the present invention to permit the selection of motor magnetics based on high torque production rather than minimum noise generation.

It is a further aim of the present invention to provide noise reduction by controlling the current waveform driving the electric motor.

SUMMARY OF THE INVENTION

In accordance with the present invention, apparatus and a related method for controlling torque and torque ripple in a multiple-phase permanent magnet axial-field motor is presented. An input current signal representative of the electrical current required to excite the motor windings to cause the motor to produce a desired torque output is provided as an open loop control signal for direct torque control or as an error signal from some external control system. A table of values corresponding to a compensation factor at each of a number of angular shaft positions of the motor is stored in a memory device for subsequent retrieval. Each compensation factor defines for each of the number of angular shaft positions, a modifying value to be applied to the input current signal to cause the motor to produce a substantially ripple free torque output by compensating for ripple contributing sources such as for example, noise, cyclical variations in load torque dependent on shaft position and other systematic variations dependent on shaft position.

The input current signal as modified in accordance with the compensation factor modifying value at each of the number of angular shaft positions provides a second current command signal. A table of multiplying values corresponding to a current amplitude factor at each of a number of angular shaft positions of the motor is stored in a memory device for subsequent retrieval and application to the second current command signal to produce a current regulation control signal.

A driving current for each phase of the motor is generated in response to the current regulation control signal at each of the number of angular shaft positions whereby the output torque of the motor is at the desired magnitude and with a ripple free characteristic.

BRIEF DESCRIPTION OF THE DRAWINGS

The above and other features will become readily apparent from the following written description and the drawings wherein:

FIG. 4 is a waveform showing the back electromagnetic force (EMF) of a typical permanent magnet motor at a given speed.

FIG. 5 shows a sinusoidal command current waveform and the computed pulse-by-pulse response waveform of the inverter circuit.

FIG. 6 shows a torque output waveform corresponding to the sinusoidal command current control waveform of FIG. 5 wherein the torque output exhibits a high torque ripple.

FIG. 7 shows the sinusoidal command current waveform modified in accordance with the present invention and the resultant pulse-by-pulse response waveform of the inverter circuit.

FIG. 8 shows a torque output waveform corresponding to the command current waveform modified as shown in FIG. 7 wherein the torque ripple is substantially eliminated.

FIG. 9 illustrates the difference in output power between the corrected current command signal and sine current command signal average output power.

DETAILED DESCRIPTION OF THE PREFERRED EMBODIMENTS

Figure 1:
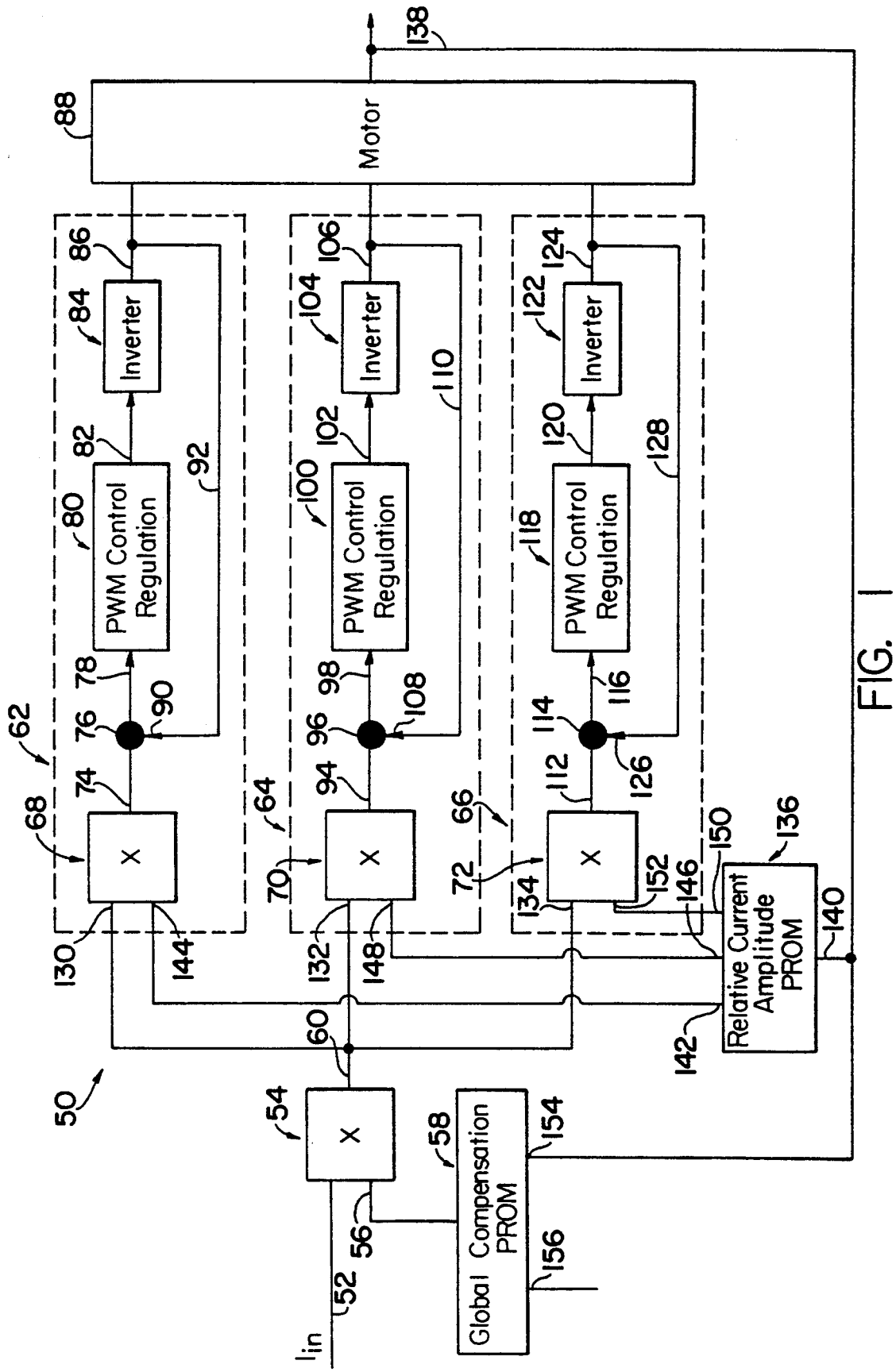
FIG. 1 is a somewhat schematic functional block diagram illustrating the general method and apparatus of the present invention.

To more fully appreciate the features and benefits of the control system embodying the present invention and as illustrated in schematic block diagram form in FIG. 1, it is beneficial to take notice of the following information. The usual normally accepted philosophy in the design of an electric motor places great concern and consideration to minimize output variations with changes in shaft position. In contrast to normal design consideration, the present invention permits an electric motor to be designed to provide high performance and high torque generation with only secondary considerations, if any, given to output variations as a function of shaft position.

In the present invention, electrical current which is injected into the motor from a high bandwidth current controller is controlled to achieve the intended output torque and also to control the generation of noise through torque ripple control and other known noise reduction means.

An electric motor which may be utilized with the present invention is preferably of the permanent magnetic alternator type wherein the permanent magnet material is preferably one of the newer rare earth magnet materials. The family of rare earth magnets for example, neodymium-iron-boron are preferred wherever operating temperatures will allow such usage. Alternatively, the rare earth magnet, samarium cobalt, for example, can be used over an extended range of temperatures. A further feature of the present invention permits the designer a choice of motor configurations based on the unique needs of the motor application. For instance, the permanent magnets may be mounted on the rotor or the stator and additionally the airgap may be oriented with either radial or axial flux.

In choosing an electric motor, a highly desirable feature is to utilize a magnetic carrier structure totally absent or devoid of salient ferromagnetic features to substantially reduce any components of reluctance torque. A motor design devoid of salient ferromagnetic elements also reduces unstable magnetic attractive forces between the magnetic carrier and the core. Magnetic attractive forces have been identified as a source of noise, either directly as the rotor is pulled from side-to-side or indirectly by causing an increase in bearing loading. It is further preferred that the permanent magnet portion of the magnetic circuit of the electric motor not contain ferromagnetic material.

One preferred motor embodiment which provides high torque at relatively low top speed is a disc alternator type having axially magnetized permanent magnets mounted on the rotor. The preferred motor embodiment is also known as an axial-flux permanent magnet disc motor. The magnetic flux crosses the airgap axially on both sides of the rotor leaving a stator on one side of the rotor disc and entering a similar stator on the opposite side of the rotor disc. In this motor type configuration, the magnet carrier is made from non-ferromagnetic components and without salient ferromagnetic elements which as discussed above provide a significant advantage.

Reference may be made to U.S. Pat. No. 4,443,906 for information relative to the general construction and operation of an electric motor having a rotor made of a non-ferromagnetic material and formed with radially disposed permanent magnets and a stator formed with a radially disposed armature winding wherein rotation is imparted to the rotor through excitation by a 3-phase switching circuit. The coil segments comprising the armature winding conduct current at right angles to the magnetic field produced by the permanent magnets to effectively vary the electrical current throughout the armature winding in order to maintain precise phase timing between the electric fields of the armature winding and the magnetic fields of the permanent magnets. Reference may be made to the disclosure of U.S. Pat. No. 4,443,906 for further details and which disclosure is hereby incorporated by reference.

U.S. Pat. No. 4,868,477 discloses a method and apparatus for controlling torque and torque ripple in a variable reluctance motor. The present invention utilizing an axial-flux permanent magnet disc motor rather than the reluctance motor disclosed in the '477 patent overcomes a number of problems and disadvantages associated with reluctance motors, particularly in applications where noise, specifically noise due to torque ripple, is of prime importance. It is known that the operation of a variable reluctance motor requires the variation of stator inductance and that any torque ripple compensation provided must be imposed based on the fundamental angle dependence operation of the motor. For example, exciting a reluctance motor with a square or sinusoidal current waveform causes the motor to produce an output torque which is predominantly angle dependent and the amplitude of the ripple current is on the same order of magnitude as the net torque output of the motor. Accordingly, a reluctance motor inherently has a high torque ripple even under ideal or optimized operating conditions. While the method and apparatus of the '477 patent reduces the torque ripple of the reluctance motor utilized, the degree of compensation necessary to reduce or eliminate noise due to torque ripple cannot be achieved.

The magnetics and motor geometry of the axial-flux permanent magnet disc motor inherently provides a reasonably smooth torque versus angle characteristic. In contrast to the reluctance motor, the axial-flux permanent magnet disc motor has a relative weak variation of stator inductance with rotor position. The rotor magnetic circuit which is comprised substantially by the permanent magnets behave incrementally like a linear magnetic material with a relative permeability of a approximately 1.09. As stated above, the remaining parts of the rotor apart from the magnet are also preferably made of a non-ferromagnetic material causing the resulting reluctance torque to be negligible compared to the normal operating torque.

Figure 2:
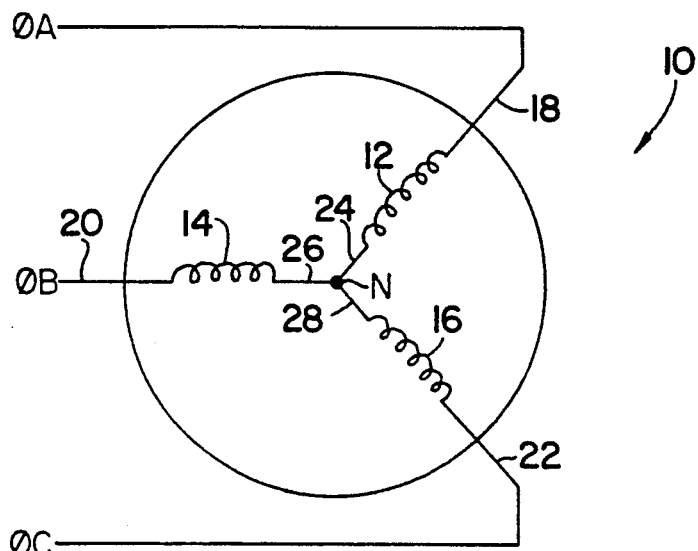
FIG. 2 is a schematic representation of the armature windings in a conventional DC brushless motor.
Figure 3:
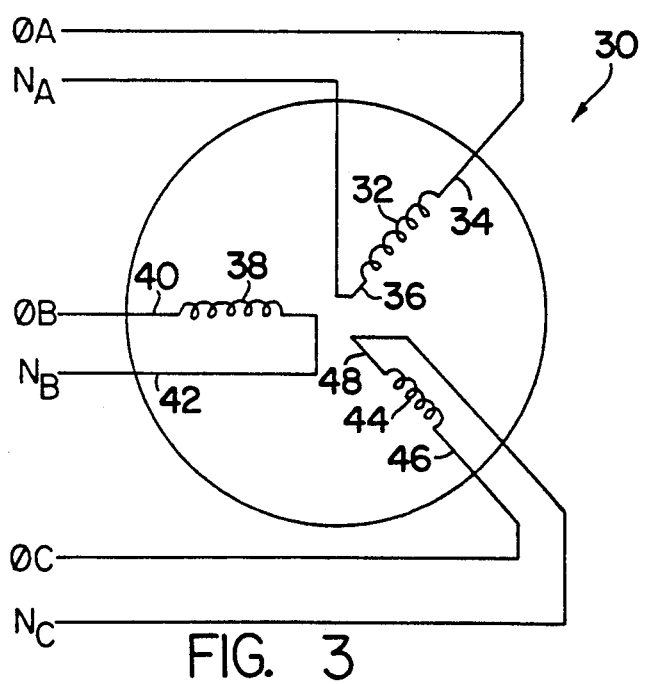
FIG. 3 is a schematic representation of the armature winding in the motor of the present invention.

A motor built according to the present invention is distinguished from the class of conventional brushless DC motors as described above specifically differing in the connection among the armature windings and between the armature windings and the driving inverters. As illustrated schematically in FIG. 2, a representative brushless DC motor generally designated 10 includes three windings 12, 14, 16 connected in a wye configuration with respective ends 18, 20 and 22 coupled to an associated excitation voltage source, typically Phase A, Phase B and Phase C, respectively. The opposite ends 24, 26, 28 of windings 12, 14 and 16 respectively are connected together. As known to those skilled in the art, Kirchhoff's current law imposes a relationship among the electrical phase currents in the windings and therefore the current in one given winding is dependent upon and related to the current in each of the remaining windings. In contrast, the current in each motor phase winding in the motor of the present invention is controlled without reference to or dependence on the other voltage phases of the remaining windings. As illustrated in FIG. 3, a motor generally designated 30 is schematically illustrated therein wherein motor phase winding 32 has respective ends 34,36 available for connection to an associated excitation voltage source, typically Phase A and its respective neutral, $N_A$. Likewise, motor phase winding 38 has its respective ends 40,42 available for independent connection to an associated excitation voltage source, typically, Phase B and its respective neutral $N_B$. A third motor winding 44 likewise has its respective ends 46,48 available for connection to third excitation voltage source, typically, Phase C and its respective neutral $N_C$. Each of the motor windings 32, 38, 44, respectively may be excited or driven from the output of a full H-bridge inverter.

The motor phase windings may also be connected in a star configuration utilizing a low impedance connection to the neutral. The source of DC power is two symmetric voltage sources connected in series through a low impedance connection to the midpoint. A low impedance conductor is connected between the midpoint of the DC source and the neutral of the star connection of the motor phase windings. In such a star configuration, each motor phase winding may be fed by a simple Halfwave-bridge inverter circuit.

It is desirable to provide a high performance pulse width modulation (PWM) inverter driving circuit at a high frequency to minimize PWM ripple amplitude and to permit rapid response to the rotor current control circuit. Normal considerations to minimize inductance and switching losses need be taken to enhance overall performance as in any high frequency circuit design. Applicants have also found that it is desirable to use IGBT (insulated gate bipolar transistors) as the switching elements in the inverters.

In addition to the sources contributing to torque ripple as stated above, another dominant contributor to torque ripple in a permanent magnet motor is the variation of the magnetic flux in the airgap as a function of shaft position. The variation of the magnetic flux gives rise to cyclic variation in the torque coefficient which is defined as the torque per unit of current. For example, if the windings are driven with a time-invariant current while the motor turns, the average torque is proportional to the current but the instantaneous torque varies in accordance with rotor position.

An additional contributor to torque ripple is due to cogging torque which is developed if the motor has armature teeth and is due to the tendency of the permanent magnets to align with the tooth structure in preferred orientations. The cogging torque is generally independent of load current in the absence of any non-linear effects. However, cogging torque is dependent on shaft position.

The effect on motor torque includes other sources, for example, reluctance effects among others. It should be noted that the majority of the total variation in torque is a repeatable function of rotor position and armature current. An additional feature of the present invention is to eliminate the cyclic variation of motor torque by defining the electric current in the motor as a function of rotor position without adding to the complexity of the motor design. Typically, shaft position feedback is already present in the motor system application and which feedback is required for proper timing of switching elements in the brushless DC drive. In addition, motor current feedback is also generally used in the control of the inverter used to excite the motor windings. In order to eliminate the cyclic variation of motor torque according to the present invention, the appropriate functional dependence of the current command input control to the motor must be properly defined and selected, and to be practical, an economical, reliable method for obtaining the required functional dependence in hardware implementation must be available.

In order to make a proper selection of an appropriate current driving waveform accounting for current dependent factors while still achieving commutation requires that the command current control for any given phase be separated into two distinct or defined parts. One part can be considered as a relative current versus amplitude function wherein the independent value of the function is the rotor position. The second part is the instantaneous global current command which at any given instant is the same for all phases. The current control signal to each phase of the motor is the product of the two component parts. The global command current value also serves as the fundamental control input to the motor. The global input command may be used as an open-loop torque control because the motor produces a torque which is nearly proportional to current. An additional feedback loop may be utilized to provide speed control or some other controlled function which acts, for example, to provide maximum torque or to eliminate some element of the torque ripple. The fundamental requirement to achieve commutation is met if the relative current versus angle function passes through (zero) 0 at the locations where the phase conductors pass from pole-to-pole. As long as the relative currents follow the position dependent functions assigned to them respectively, the interaction of the magnetic field and armature current will produce a torque which is directly proportional to the amplitude of the current with position dependent gain.

In the extreme limitation where interaction of the magnetic field and armature current is the only contribution to torque, variation in the current amplitude in an inverse proportion relationship to the gain produces a constant torque versus angle behavior. The global current command signal required to produce a constant torque will be generally more complicated than a simple inverse proportion relationship to the torque constant when other effects contribute to motor torque; however, the global current command signal remains a function only of position in the absence of non-linear behavior.

Referring now to FIG. 1, a schematic functional block diagram of the control system and motor embodying the present invention is illustrated therein and generally designated 50. A programmable read-only memory (PROM) is utilized to store digital signals representative of the shaft position dependent current characteristic information which in turn is utilized to determine the current command for each phase. The global current command signal is connected to an input 52 of a multiplier circuit shown generally by the functional block diagram 54. The global current command signal may be used as an open-loop control signal for torque control directly as explained above, or in applications where the motor has an external control loop regulating the speed or some other function, the input at lead 52 is generally the error output signal of the external control. A second input 56 to the multiplier 54 receives a signal which is a function of the global current compensation characteristic stored in a PROM table look-up designated generally by the function block 58. The output 60 of the multiplier 54 is inputted to a separate current controller associated with each phase and generally represented by the dashedline box 62, 64 and 66, respectively in FIG. 1. The current controllers 62, 64 and 66 include a multiplier represented by the functional block 68, 70 and 72, respectively. The output 60 of the multiplier 54 is connected to the input 130 of the multiplier 68, the input 132 of the multiplier 70 and the input 134 of the multiplier 72.

Each current controller 62, 64, 66 is substantially identical to one another apart from the associated phase winding of the motor that it drives. Accordingly, the current controller 62 is described with the understanding that its description applies also to current controllers 64 and 66. The output 74 of the multiplier 68 is coupled to a summing circuit 76. The output 78 of the summing circuit 76 is coupled to the input of a PWM regulation control circuit shown generally by the function box 80. The output 82 of the PWM control circuit 80 is coupled to the inverter 84 which generates at its output 86 the motor phase winding driving current which has a magnitude and waveform in accordance with the desired compensation at the given shaft position of the motor 88. The output of the inverter 84 is also fed back to a second input 90 of the summing circuit 76 through the feedback loop 92 and is compared to the desired input signal at the output 74 of the multiplier 68 and in turn produces an error difference signal at the output 78 to drive the PWM control circuit 80 to achieve the desired current output from the inverter 84.

The current controller 64 includes the output 94 of multiplier 70 coupled to summing circuit 96 the output 98 of which is coupled to PWM regulation control circuit 100. The output 102 of the PWM control circuit 100 is coupled to the inverter 104 upon whose output 106, the motor phase winding driving current excites the appropriate phase of the motor 88 and is fed back to the input 108 of the summing circuit 96 via the feedback loop 110.

The current controller 66 includes the output 112 of multiplier 72 coupled to the summing circuit 114 whose output 116 is the difference signal between the input and the feedback signal at input 126 from the inverter 122 output 124 via the feedback loop 128.

A programmable read-only memory (PROM) 136 stores information in a digital format and is representative of the relative current amplitude characteristic as a function of rotor position. The rotor position of the motor 88 may be sensed using well known techniques such as optical or magnetic encoders which may be coupled directly to the shaft of the motor or may detect sensors on the shaft. Suffice for purposes of this disclosure that a signal representative of the angular shaft position of the motor is determined and provided on the feedback loop 138 for each angular shaft position for which it is desired to have an output. The output shaft encoded signal is fed to an input 140 of the PROM 136 and functions as an input address to the PROM to access information stored in a corresponding location in memory for output to the multipliers. The PROM 136 has a first output 142 coupled to the input 144 of the multiplier 68. A second output 146 of the PROM 136 is connected to an input 148 of the multiplier 70 and a third output 150 of the PROM 136 is connected to an input 152 of the multiplier 72. It is possible to utilize a single PROM as illustrated in FIG. 1 due to the periodicity of the current amplitude function and the symmetries common in an electric motor by generating one relative current amplitude function characteristic and shifting the look-up register storing the information by a predetermined factor for each phase being controlled. The PROM 136 may also have sectionalized memory wherein the relative current amplitude function characteristic for each phase is stored for subsequent retrieval and may differ from the other phases to compensate for any phase asymmetries or other factors.

In instances where computation is required from instant-to-instant to determine the global current compensation function signal it is preferable, to provide efficient operation, to store the position dependent information in one place. The computation may be performed once at each time increment and the command current may be determined by multiplication at each time increment. As illustrated in the functional block diagram of FIG. 1, the global current compensation characteristic information is accessed, retrieved from memory and outputted to the multiplier 54 input 56 in accordance with the output shaft encoded signal supplied to the input 154 via the feedback loop 138. Additional inputs, generally designated 156, may also be used in conjunction with the shaft encoded signal to access a different current compensation characteristic stored in the global current compensation PROM 58 to provide a compensation to reduce noise and torque ripple attributable to other sources and specifically identified operating conditions.

In very simple cases where the required global current compensation characteristic is a function of rotor position only and not dependent on the current, the relative current amplitude function value may be premultiplied by the global current compensation value once and stored in a relative amplitude array in a memory device for subsequent retrieval. In this case, separate storage for the global compensation command signal is not required. This alternate embodiment is readily apparent through simplification of the functional block diagram illustrated in FIG. 1.

One method to determine the appropriate global current compensation value when there is dependence on variables in addition to shaft position is to interpolate from a multi-variable table stored in the PROM. For example, if the required compensation is a function of position and speed only, a compensation versus position function characteristic can be stored for a different number of values of speed. For purposes of this disclosure, each such single speed function characteristic is referred to as a "page" in memory. As the motor speed varies, the controller may step discretely from "page" to "page" generally with some computation hysteresis to preclude hunting between "pages". Alternatively, the controller may interpolate continuously between "pages". Similar methods may be also used to determine variations of the global current compensation characteristic with respect to other variables of interest.

The information to be stored in the PROM look-up tables defining the necessary compensation function at each desired shaft angular position may be determined either theoretically or empirically. The motor designer knows the motor torque per ampere versus angle characteristic of the motor in advance of the actual construction of the motor. The characteristic may then be confirmed after the motor is constructed or may be refined upon testing of the motor. The theoretical compensation values to be stored in the PROM look-up tables is generally sufficient for many applications, however the theoretical motor torque per ampere versus angle transfer function may be modified as necessary in accordance with a given application to generate different compensation values for storage in the PROM look-up table.

Referring now to FIGS. 4-9 in which a number of representative waveforms are illustrated and identified below, the method and apparatus of the present invention are further illustrated and the waveforms are the result of numerical simulations of the operation of the invention. FIG. 4 illustrates a representative waveform of the back electromagnetic force (EMF) at a given motor speed. The back EMF waveform is used in tabular form as input data to the process of determining the relative current amplitude function. The table entries describing the back EMF waveform are thus that of a given motor and is generally representative of the back EMF in a permanent magnet motor where the design goal is to maximize the magnet-to-armature mutual flux. The back EMF waveform is generally designated 170 and as recognized by those skilled in the art, it cannot be accurately approximated by a single frequency sinusoidal function.

FIG. 5 shows a sinusoidal command current waveform generally designated 172, which may be used to control the PWM inverter as described above. The calculated output of the response of the inverter circuit is illustrated by the waveform generally designated 174. It is seen that the pulse-by-pulse response of the inverter circuit represented by the waveform 174 tracks the sinusoidal command current characteristic very closely and accordingly can be expected to accurately track the input command current control waveform signal.

Referring to FIG. 6, a torque output waveform generally designated 176 is illustrated and corresponds to the torque output that would be generated in accordance with the sinusoidal command current control waveform signal illustrated in FIG. 5. It should be noted that the torque and power output waveform characteristic are identical apart from a scale factor. The torque output waveform (and power output waveform) exhibit a significant ripple when the command current control waveform signal is a sinusoidal function.

Although there are a number of specific PWM logic circuits and controls for inverter driver circuits, the exemplary illustration utilized in the numerical simulation scheme above contemplates a switch transition whenever the absolute value of the output current exceeds the absolute value of the command current, which scheme produces a bias in the low frequency current. The amplitude of the low frequency current is approximately half the peak-to-peak value of the PWM ripple. The magnitude of the PWM ripple is a function of the output current and the difference between the back EMF and the DC bus voltage used in the PWM logic circuit. The above factors, output current and back EMF, which determine the ripple amplitude are predetermined functions of angular shaft position and therefore the command current signal may be modified by a value which is equal to the low frequency bias to produce an output current which more nearly approximates the desired sinusoidal function without a bias. In the typical case of a motor with a non-sinusoidal back EMF it can be seen that a perfect single frequency sinusoidal current will not be the optimum waveform to reduce the torque ripple.

The torque ripple and output power ripple can be reduced in accordance with the present invention by modifying the command current waveform as illustrated in FIG. 7. The modified command current waveform is generally designated 178 and the output pulse-by-pulse response of the inverter circuit is indicated generally by the response curve 180. The command current waveform 178 is derived utilizing an algorithm such that the power output of each phase varies as a sine-squared function of time. The table entries for the reference command current control waveform in the illustrated embodiment are computed utilizing the equation:

$$I_{com} = P*sin^2(Theta)/V_{bemf}$$

wherein P is the peak power required from one phase and which power is $\frac{2}{3}$ of the 3-phase average power; Theta is a pointer variable and advances uniformly from 0 to 360 degrees as the rotor position advances through one electrical cycle; and $V_{bemf}$ is the value of the back EMF at the rotor position and corresponds to the given point value stored in the current command table of values.

The resultant torque output waveform corresponding to the modified input command current waveform illustrated in FIG. 7 is illustrated in FIG. 8 and is generally designated 182. It can be seen that the ripple in the torque output waveform (also output power) is substantially reduced and that there is no torque ripple content at the frequency of the ripple as in the sinusoidal current command signal of FIG. 5. The remaining ripple, to the extent that there is any ripple, is generally attributal to the PWM control circuit and occurs at the PWM frequency. As is known to those skilled in the art, the remaining PWM ripple in the torque output can be substantially eliminated utilizing well known reduction methods.

Referring now to FIG. 9, the torque output (power) waveform 176 of FIG. 6 and the torque output (power) waveform 182 of FIG. 8 are shown for comparison and illustrate that the magnitude of the output torque (power) achieved with the command current correction is less than the output torque (power) achieved with the sinusoidal current command waveform. The corrected current command waveform 182 has a significantly lower root-mean-square value than the sine current waveform 176. The command current waveform as modified with the present invention can be increased substantially without modification of the waveform to a magnitude which produces an average motor winding heating to be the same as in the sinusoidal command current illustration and a comparison made between the output torque (power) will show that the output torque (power) is substantially equivalent in both cases.

It will be recognized by those skilled in the art that the above illustration based on a sine-squared function of time can be extended to a family of applications which have the property of zero net torque ripple. Additional functions of power versus time for each phase can be defined with the characteristic that the total 3-phase power is constant and the phase current can be computed as a function of the phase power using a similar method as described above. Accordingly, the sine-squared function is presented to facilitate understanding and explanation of the apparatus and method of the invention.

In some applications, it may be necessary to define a compensation characteristic to provide greater precision than is available from a theoretical compensation based on design criteria of the motor. For applications requiring greater precision, the theoretically determined compensation values may be used to obtain a first estimate of a more precise compensation value. The motor is then operated and the resulting torque ripple is determined and recorded. The theoretically determined compensation is then modified using the recorded torque ripple in place of the theoretically calculated torque ripple. The modified compensation values are then stored in the PROM and the process is repeated as necessary until convergence is reached. An additional alternate method to determine the global compensation function starts with a proposed compensating function which consists of a description of the electric motor torque ripple response as a mathematical function having the appropriate symmetry and periodicity characteristics and one or more initially unknown parameters. Such a mathematical function might be for example a truncated Fourier series having a fundamental period of once per revolution or once per pole-pair passage. The motor is then operated to provide a baseline characteristic using the theoretically determined compensating function. The trial compensating function consists of the combination of the best known or determined compensating factors at the given point in time plus the effect of a predetermined small variation of one of the unknown parameters. The difference between the response to the best known compensation factors and the response to the trial compensating function can be attributed to the variation of the unknown parameter which is varied. The effect of different values of the unknown parameter under study is assumed to be linear and the best compensating value for the parameter can be chosen. The resulting compensating function value is then used with the expectant result that the refined global compensation value result is better than the previous compensation function known to this point. The foregoing process is repeated for each of the unknown parameters in the baseline characteristic set and the process is repeated until such time as the global compensation function yields motor operation where no systematic, position dependent torque ripple is observed.

Thus far, the present invention has focused on reducing cyclic variation in shaft position dependent torque ripple. The above discussion of the present invention may also be applied to transform motor torque versus angle from its inherent characteristic to any other characteristic within the capability of the electric motor. For example, the motor can be used to compensate for variations in load torque which has a repeatable relationship to shaft position. One example of a physical phenomena which may be compensated for using the technique of the present invention is the passage of a propeller blade by its strut.

The present invention may also be used to alter other significant outputs of the motor including cyclic in plane motion or cyclic axial motion. The motion to be compensated for or altered must have some dependence on the current amplitude and a cyclic dependence on shaft angles to utilize the technique of the present invention. Accordingly, various other motions dependent on shaft angle may be compensated for either individually or in combination with compensation for torque ripple.

Figure 10:
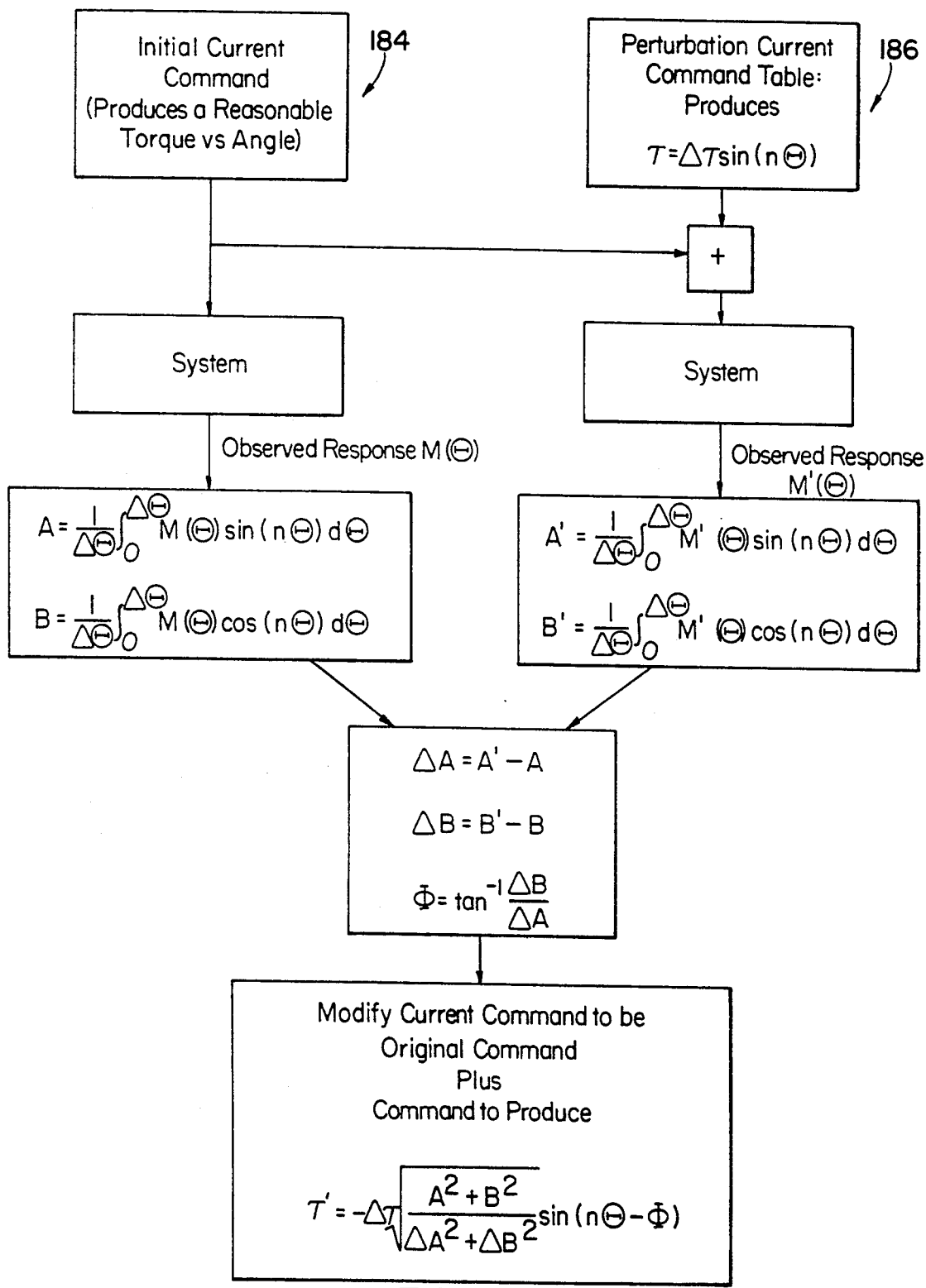
FIG. 10 is a flowchart illustrating one embodiment of the method of the present invention.

One method to define the table entries for the current command input signal in accordance with the general method of the invention as described above is illustrated in the flowchart shown in FIG. 10. As illustrated, the method starts with a motor operating in its intended installation with a normal load and in accordance with a current command characteristic derived as discussed above and as represented by the function box generally designated 184. The motor is then operated at a constant speed and torque and a variable, such as for example a vibration, which is excited or energized by torque or other cyclic electromagnetic interaction in the motor is recorded. The torque signal is correlated with one of a number of basis functions such as sine and cosine functions at integer multiples of the shaft frequencies. The entries in the current command table are then changed to provide a superposition of the original current command values with a component that produces a 3-phase torque which varies as one of the basis functions. The change in the current command value is represented by the function block 186 and the response of the motor is again measured and correlated to the basis function with any change in response being attributed to the change in the value of the entries in the look-up table. A set of functions which influence the motor response can be determined. In the case of sine and cosine basis functions, the change in the response will be predominantly in the sine and cosine function at the same frequency as the change in the values in the look-up table. When a sufficient number of functions which influence the response have been determined, the command current look-up table values can be computed and presumably provides an improved response. The method illustrated in the flowchart of FIG. 10 utilizes the case of sinusoidal basis functions wherein the object is to eliminate from the response any component with a period equal to $2\pi/n$. A number of iterations of the method can be done until no further improvement is required or until the noise or non-repeating factors render it impossible to determine the various individual components of the observed response.

A further feature of the present invention relates to the ability to redefine the global current compensation values initially determined during the life of the electric motor and system within which the motor is utilized. Some changes in the system occur slowly over time for example cavitation erosion of a propeller or wear in a bearing which change the motor characteristic initially compensated for. Obviously, from a practical standpoint, there is a cost involved to retest and redetermine the values to be stored in the PROM look-up table. Accordingly, the benefits to be gained must be evaluated against the cost involved in generating a new set of compensation values.

The invention claimed:

1. Apparatus for controlling torque and torque ripple in a multiple-phase permanent magnet axial-field motor, said apparatus comprising:

means for providing an input current signal representative of the electrical current required to cause the motor to produce a desired torque output;

first memory means for storing for subsequent retrieval a table of values corresponding to a compensation factor at each of a number of angular shaft positions of the motor, said compensation factor defining for each of said number of angular shaft positions a modifying value to be applied to said input current signal to cause the motor to produce a substantially ripple free torque output;

means for multiplying said input current signal by said modifying value to produce a second current command signal;

second memory means for storing for subsequent retrieval a table of values corresponding to a current amplitude factor at each of a number of angular shaft positions of the motor, said current amplitude factor defining for each of said number of angular shaft positions a multiplying factor to be applied to said second current command signal to produce a current regulation control signal at each of said number of angular shaft positions;

means for multiplying said second current command signal by said current amplitude factor to generate said current regulation control signal, and means for generating a driving current for each phase of the motor in response to said current regulation control signal at each of said number of angular shaft positions whereby the output torque of the motor is at the desired magnitude and has a ripple free characteristic.

2. Apparatus for controlling torque and torque ripple as defined in claim 1 wherein said value of said compensation factor at each of said number of angular shaft positions is identified for at least one torque ripple source contributing to torque ripple.

3. Apparatus for controlling torque and torque ripple as defined in claim 1 wherein the magnitude of each of said compensation factor values is stored in a corresponding memory location having an address dependent directly on the specific angular shaft position of the motor for which position the compensation factor value is determined.

4. Apparatus for controlling torque and torque ripple as defined in claim 3 wherein the magnitude of each of said multiplying factor values is stored in a corresponding memory location having an address dependent directly on the specific angular shaft position of the motor for which position the multiplying factor value is determined.

5. Method for controlling torque and torque ripple in a multiple-phase permanent magnet axial-field motor, said method comprising the steps of:

providing an input current signal representative of the electrical current required to cause the motor to produce a desired torque output;

storing in a first memory device for subsequent retrieval a table of values corresponding to a compensation factor at each of a number of angular shaft positions of the motor, said compensation factor defining for each of said number of angular shaft positions a modifying value to be applied to said input current signal to cause the motor to produce a substantially ripple free torque output;

multiplying said input current signal by said modifying value at each of said number of angular shaft positions to produce a second current command signal;

storing in a second memory device for subsequent retrieval a table of values corresponding to a current amplitude factor at each of a number of angular shaft positions of the motor, said current amplitude factor defining for each of said number of angular shaft positions a multiplying factor to be applied to said second current command signal to produce a current regulation control signal at each of said number of angular shaft positions;

multiplying said second current command signal by said current amplitude factor retrieved from said second memory device to generate said current regulation control signal at each of said number of angular shaft positions, and generating a driving current for each phase of the motor in response to said current regulation control signal at each of said number of angular shaft positions whereby the output torque of the motor is at the desired magnitude and has a ripple free characteristic.

* * * * *